March 31 1925.
R. E. KLAGES
DRAG LINK
Filed March 19, 1923
1,531,557
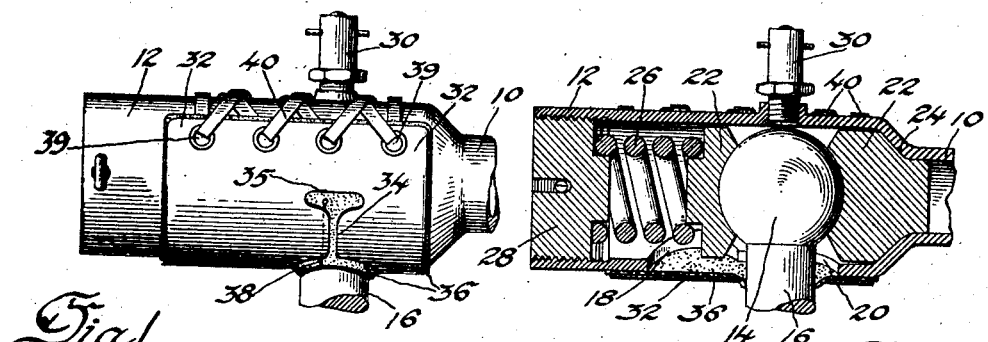
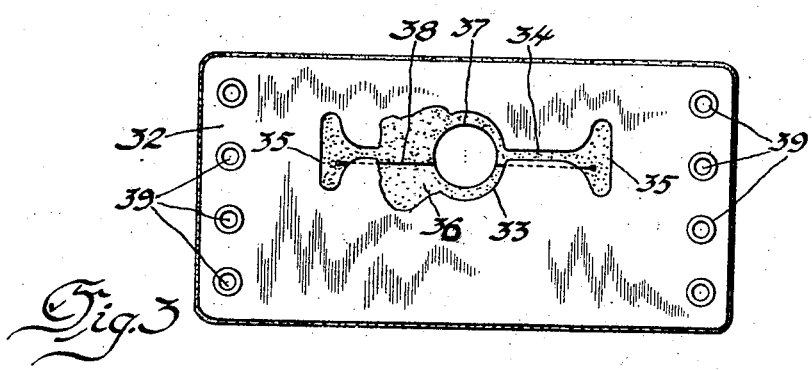
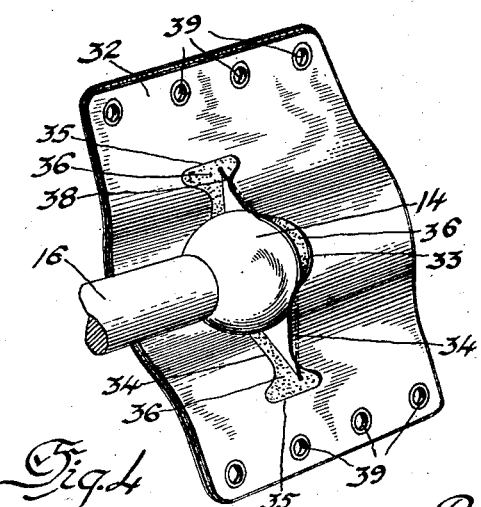
Inventor
Reynold E. Klages
By his Attorney Patented Mar. 31, 1925.

1,531,557

UNITED STATES PATENT OFFICE.

REYNOLD E. KLAGES, OF COLUMBUS, OHIO.

DRAG LINK.

Application filed March 19, 1923. Serial No. 626,022.

*To all whom it may concern:*

Be it known that I, REYNOLD E. KLAGES, a citizen of the United States of America, and a resident of the city of Columbus, county of Franklin, and State of Ohio, have invented certain new and useful Improvements in Drag Links, of which the following is a full, clear, concise, and exact description, such as will enable others skilled in the art to which the invention relates to make and use the same, reference being made therein to the accompanying drawings, which form a part of this specification.

This invention relates to a new and useful improvement in dust guards, and more especially a guard for covering a ball and socket joint as employed in the cross tie rods or reach rod connections of motor vehicle steering gears.

The objects of the invention are to devise a guard of simple and durable construction, and preferably comprising a reinforced pliable material which may be placed in position when assembling joints of varying sizes and modified designs, and which will effectively close about the shank of the ball member and around the socket member to protect the lubricated parts of the joint from dust, water or other foreign matter.

These and other objects will appear from the following description, taken in connection with the accompanying drawings which form a part of this specification, and in which:

Figure 1 is a side elevation view of one end of a steering gear drag link, showing the dust guard applied thereto.

Figure 2 is a longitudinal sectional view of the drag link end and dust guard as shown in Figure 1.

Figure 3 is a plan view of the dust guard, and

Figure 4 is a perspective view showing the dust guard spread over the ball end of the steering arm.

For the purpose of illustration I have shown the invention as applied to a particular form of steering arm connection for an automobile, but it will be understood that the dust guard may be applied and used on other connections, and the actual construction of the drag link may be varied within wide limits.

Referring to the drawings, the reference numeral designates a drag link having an end socket 12 which is adapted to receive the ball 14 attached to the arm 16 of an automobile steering gear. The socket 12 is provided with the usual opening 18 for the reception of the ball of the connecting arm, and a restricted portion 20 through which the ball cannot be drawn from the assembled link, though permitting free movement of the arm 16 in said restricted portion 20.

On the opposite sides of the ball 14 and engaging therewith are bearing cups 22. One of the cups abuts against the shoulder 24, and the other is engaged by a spiral compression spring 26 secured in the socket by the end plug 28. A grease cup 30, adapted to supply lubricant to the ball and associated parts, is provided for the socket 12.

In order to retain the lubricant within the end portion 12, and to prevent the entrance of dust and dirt, thereby maintaining proper lubrication of the ball, I have provided a closure or dust guard for the hole 18 and restricted slot 20.

The guard as shown preferably comprises a plate 32 of thin flexible spring metal alloy having non-corrosive properties, or having the surface thereof treated to prevent corrosion; said plate 32 having an elliptical opening 33 therethrough approximately in the centre, and two slots 34 extending from the central opening 33 in alignment with the minor axis thereof to the end openings 35.

The plate 32 is faced on the inner side with a pliable lining 36, such as leather, having a central circular opening 37 considerably smaller than the central opening in the plate 32, and the slits 38 extending parallel with the slots 34 but sufficiently to one side thereof to pass under the plate 32 at one side or the other of the slots leading to the end openings 35.

The plate 32 and lining are fastened together by eyelet rivets 39 arranged adjacent the two end edges as shown, so that the guard may be laced over the ball arm and socket by first spreading the guard apart along the slots 34 in the plate 32 and the slits 38 in the lining 36, the flexibility of the lining and the shape of the slots enabling the guard opening to be spread sufficiently to pass over the ball end 14 of the steering arm 16, after which the ball end 14 is assembled in the socket 12 and the guard laced in position as shown in Figures 1 and 2 by the lace 40 threaded through the eyelets 39.

The guard thus secured about the joint will effectively protect the same from dirt, dust or grit and will retain the lubricant about the ball end and its bearing as the spring metal plate keeps the lining even where slit, fitting snugly around the socket opening, and the lining about the central opening fits snugly about the shank of the ball arm, and yet will accommodate any movement of the arm shank about the ball centre as required in steering gear connections of the type described.

The lace holding the guard will last indefinitely, as there is no chafing or movement to weaken it, and the entire guard padded as described by the flexible lining will be quiet and neat in appearance.

While I have described what I deem to be the preferred embodiment of my invention, it will be understood that various modifications and changes may be made without departing from the spirit and scope thereof.

Having thus described my invention, what I claim is:

1. A guard for enveloping articulated joints comprising a single plate of flexible metal having an opening therethrough with slots extending therefrom only part way to the edge and a lining of flexible absorbent material secured to said plate, and having an opening therethrough registering with the opening in said plate and slots extending from the opening in said lining and out of register with the slots in said plate.

2. A guard for enveloping articulated ball and socket joints comprising a flexible plate of metal having a central opening with radial slots therefrom terminating in end cross openings, and a flexible lining of absorbent material having a central opening of lesser diameter than the opening in said plate and radial slits out of register with the slots in said plate.

3. The combination with a socket member having a lateral opening and a ball arm articulated therein, of an enveloping guard comprising a flexible metallic plate having a central opening and radial slots permitting said opening to spread for the entrance of said ball arm, an absorbent lining secured to said plate by eyelet rivets and having a central opening and radial slits extending therefrom and a lace threaded through said eyelets and binding said guard around said socket member.

In testimony whereof I affix my signature.

REYNOLD E. KLAGES.